United States Patent [19]

Shaw et al.

[11] Patent Number: 4,536,058

[45] Date of Patent: Aug. 20, 1985

[54] METHOD OF MANUFACTURING A FIBER OPTIC DIRECTIONAL COUPLER

[75] Inventors: Herbert J. Shaw, Stanford; Ralph A. Bergh, Palo Alto, both of Calif.

[73] Assignee: The Board of Trustees of The Leland Stanford Junior University, Stanford, Calif.

[21] Appl. No.: 300,955

[22] Filed: Sep. 10, 1981

[51] Int. Cl.³ ............................................. G01N 37/00
[52] U.S. Cl. ................................. 350/320; 350/96.15; 356/128; 356/382
[58] Field of Search ............... 350/96.15, 96.16, 96.20, 350/96.21, 320; 356/73.1, 128, 350, 351, 356, 382; 156/153, 154; 65/61; 51/283 R

[56] References Cited

U.S. PATENT DOCUMENTS

| | | | |
|---|---|---|---|
| 4,021,097 | 5/1977 | McMahon | 350/96.15 |
| 4,136,929 | 1/1979 | Suzaki | 350/96.15 |
| 4,259,016 | 3/1981 | Schiffner | 356/350 |
| 4,301,543 | 11/1981 | Palmer | 350/96.15 X |
| 4,307,933 | 12/1981 | Palmer et al. | 350/96.16 |
| 4,315,666 | 2/1982 | Hicks, Jr. | 350/96.15 |
| 4,387,954 | 6/1983 | Beasley | 350/96.15 |

FOREIGN PATENT DOCUMENTS

| | | | |
|---|---|---|---|
| 2812346 | 9/1978 | Fed. Rep. of Germany . | |
| 2922938 | 12/1980 | Fed. Rep. of Germany . | |
| 52-14430 | 2/1977 | Japan . | |
| 52-24539 | 2/1977 | Japan | 350/96.15 |
| 53-91752 | 8/1978 | Japan . | |
| 54-4153 | 1/1979 | Japan | 350/96.15 |
| 0102151 | 8/1979 | Japan | 356/73.1 |
| 0107745 | 8/1979 | Japan | 350/96.21 |
| 101334 | 8/1979 | Japan . | |
| 118255 | 9/1979 | Japan | 350/96.15 |

OTHER PUBLICATIONS

Weidel et al., "Tee-Coupler for Single-Mode Fibres", *Electronics Letters,* vol. 15, No. 23, Nov. 1979, 2 pages.
Helmuth Lemme, "Points of Views Concerning the Technology of Light Conductors", *Elektronik,* No. 15, Jul. 1980, pp. 35-46, Translation.
Franz Auracher, Communication from the SEIMENS AG Research Laboratories, Munich, "Principles and Characteristics of Branching Elements for Multimode Fibers", *Frequenz* 34, vol. 34, No. 2, (1980), pp. 52-57, Translation.
"Fabrication of Low-Loss 3 dB Couplers with Multimode Optical Fibres", *Electronics Letters,* vol. 14, No. 5, Mar., 1978, pp. 157-158, Tsujimoto et al.
"Single-Mode Fiber-Optical Power Divider: Encapsulated Etching Technique", S. K. Sheem et al., *Optics Letters,* Jan., 1979, vol. 4, No. 1.
"Single Mode Fiber Optic Directional Coupler", *Electronics Letters,* vol. 16, No. 7, Mar. 27, 1980, Bergh et al.

*Primary Examiner*—John Lee
*Attorney, Agent, or Firm*—Knobbe, Martens, Olson & Bear

[57] ABSTRACT

A fiber optic directional coupler comprises a pair of bases, with respective longitudinal, arcuate grooves formed therein on confronting faces thereof, for mounting a pair of optical fibers in close proximity. A portion of the cladding is removed from each of the fibers to form planar facing surfaces which permits the spacing between the fiber cores to be within a predetermined critical zone so that guided modes of the fibers interact, through their evanescent fields, to cause light to be transferred by evanescent field coupling between the fibers. The coupler is "tuned" to a desired coupling efficiency by offsetting the planar facing surfaces to increase the spacing between the fiber cores. A method of manufacture of the coupler includes procedures which permit the coupler halves to be made symmetrical. The method also permits couplers having given coupling characteristics to be reproduced.

22 Claims, 25 Drawing Figures

METHOD OF MANUFACTURING A FIBER OPTIC DIRECTIONAL COUPLER

BACKGROUND OF THE INVENTION

The present invention relates generally to fiber optic directional couplers, and particularly to fiber optic directional couplers utilizing evanescent field coupling.

Fiber optic directional couplers transfer optical power between two fibers or strands of fiber optic material. In evanescent field coupling, guided modes of the two strands interact, through their evanescent fields, to cause the optical power transfer. Typically, evanescent field coupling is achieved by removing a portion of the cladding from the fibers, and positioning them in close proximity so that each core is within the evanescent field of the other core, thereby causing the aforementioned modal interaction.

One type of evanescent field coupler is described in an article entitled "Single Mode Fiber Optical Power Divider: Encapsulated Etching Technique", published in the January, 1979 issue of *Optics Letters*. This coupler, which will be referred to as a "bottle coupler", comprises two optical fibers that have been twisted together. The twisted fiber is inserted into a glass bottle which is filled with an etching solution to remove a portion of the cladding. The etching solution is then drained, and replaced by index matching oil. However, as indicated in the last paragraph of this article, this device has substantial throughput losses of about 2 dB. Further, it appears that this coupler may be mechanically unstable and fragile.

Other types of evanescent field couplers include integrated-optic couplers which comprise waveguides fabricated in planar substrates. However, these couplers have internal losses, relatively high input and output coupling losses and internal losses when used in fiber optic systems, and they tend to be sensitive to the polarization of the light being transmitted. Such a coupler is disclosed in an article entitled "Optical Directional Couplers with Variable Spacing", published in the Mar. 1, 1978 issue of *Applied Optics*.

SUMMARY OF THE INVENTION

The coupler of the present invention comprises a pair of bases or blocks having respective arcuate grooves for mounting respective strands of fiber optic material. Material is removed simultaneously from the blocks and the strands until the desired amount of fiber optic material has been removed. The strands are then positioned in close proximity to each other, with the cutaway portions of the fiber in facing relationship. The respective surfaces of these cutaway portions will be referred to herein as the fiber "facing surfaces".

It has been found that, to ensure proper evanescent field coupling, the amount of material removed from the fibers must be carefully controlled so that the spacing between the core portions of the strands is within a predetermined "critical zone". This causes each strand to receive a significant portion of the evanescent field energy from the other strand, and coupling is achieved without significant energy loss.

It is a significant advantage of the coupler of the present invention that the coupled power can be adjusted, through a predetermined range, to a desired value, without substantially affecting the throughput loss. Such coupler adjustment, referred to herein as "tuning the coupler", may be accomplished by translating the fibers so that their respective facing surfaces are slidingly offset relative to one another. Moreover, by varying such offset in response to a time varying signal, the coupler of the present invention may function as a modulator.

Another feature of the present invention is that the coupler is capable of achieving low throughput losses. Experimental results show that throughput losses of 0.2 dB have been attained, although losses of 0.5 dB are more common. Furthermore, the coupler has a high directivity, with substantially all of the coupled power being delivered to the output side of the coupler. Tests have shown that the directionally coupled power is greater than 60 dB above the contra-directionally coupled power. The coupler is also capable of directionally coupling 100% of the optical power.

The coupler also has an excellent polarization response in that it will pass light of any polarization almost equally well. Thus, the characteristics of the coupler are substantially independent of polarization.

The present invention is particularly advantageous for use with single mode fibers. As is well known, such fibers are extremely small, delicate, and fragile, and thus they can be easily broken, and are extremely susceptible to mode perturbation caused by microbends. These problems are substantially eliminated by permanently mounting the fibers in the arcuate grooves of the blocks, as described above. The blocks not only provide a rugged, durable structure for the coupler, but also provide a means for rigidly holding these delicate fibers while the fiber optic material is removed therefrom. Further, the blocks permit adjustment of the relative positions of the fibers for "tuning" the coupler, as described above.

The present invention also includes a method of manufacture, which is particularly advantageous for single mode fibers. Because the evanescent field of a single mode fiber is typically buried deep within the cladding, it is extremely difficult to determine the precise amount of material that must be removed to insure that the core portions of the strands are within the "critical zone". Accordingly, the method of manufacture of the coupler provides relatively precise control over the amount of material removed from the strands. Moreover, it also advantageously provides for coupler reproducibility. Such reproducibility not only permits duplication of a coupler having given characteristics, but also advantageously permits the coupler halves to be symmetrical, as dissymmetry can alter the propagation characteristics of the fibers, resulting in weaker coupling.

DESCRIPTION OF THE DRAWINGS

These and other advantages of the present invention are best understood through reference to the drawings, in which.

DESCRIPTION OF THE PREFERRED EMBODIMENT

Figure 1:
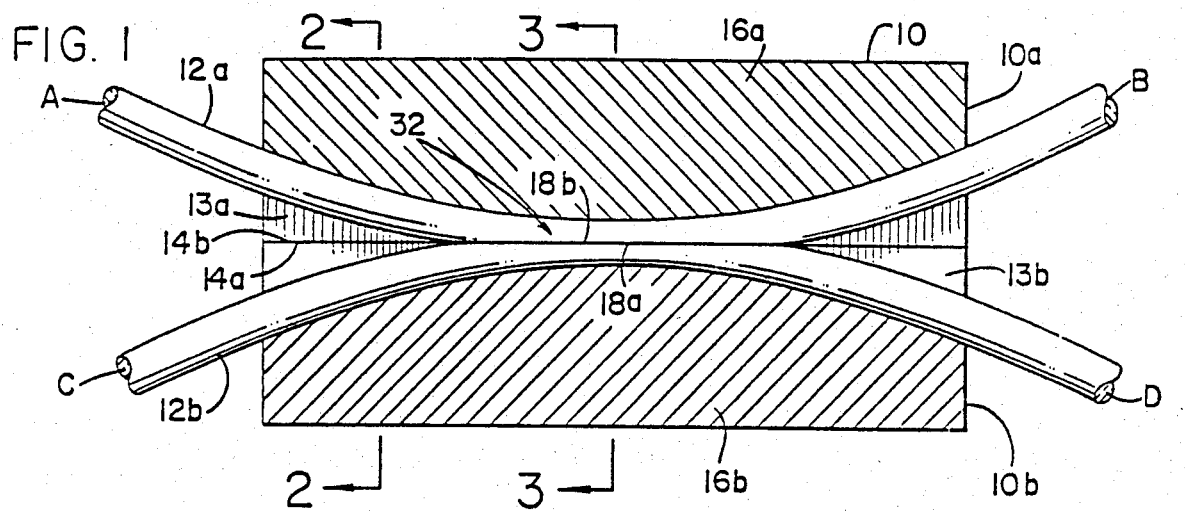
FIG. 1 is a cross-sectional view of the fiber optic coupler of the present invention, showing a pair of fiber optic strands mounted in respective arcuate grooves of respective bases.
Figure 2:
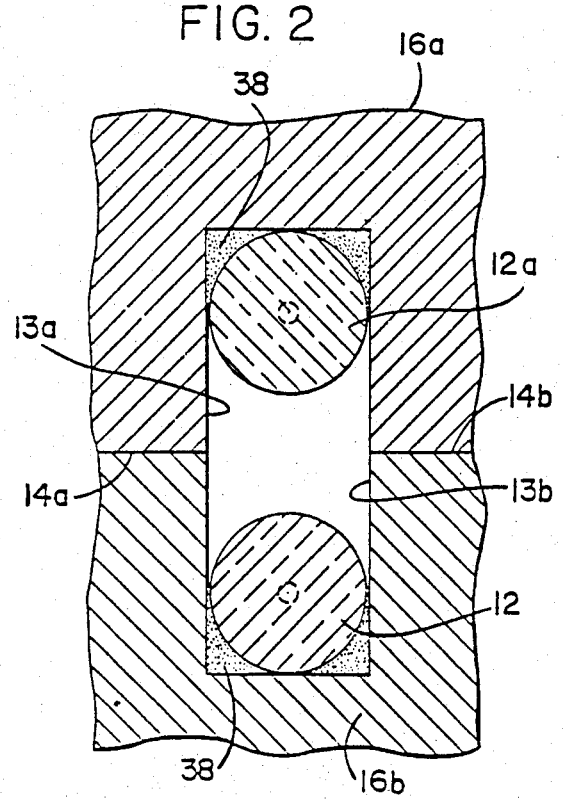
FIGS. 2 and 3 are cross-sectional views of the coupler of FIG. 1, taken along the lines 2—2 and 3—3, respectively.
Figure 3:
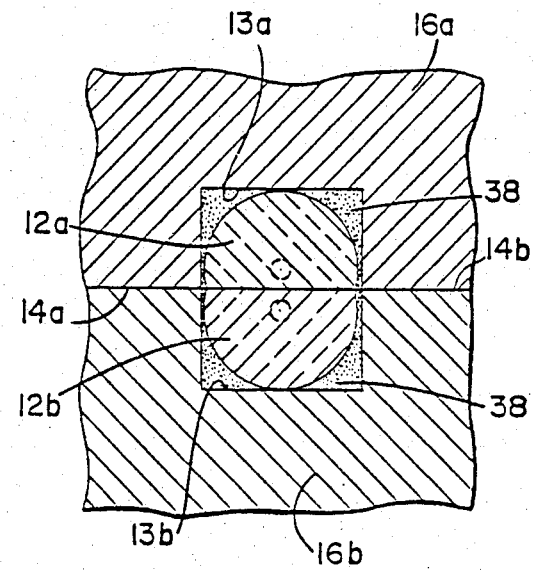
Figure 4:
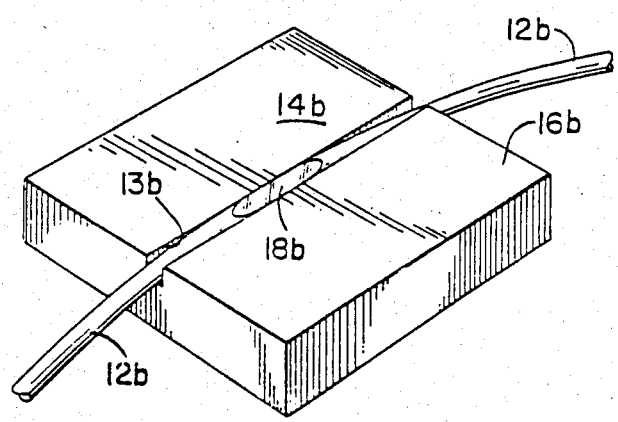
FIG. 4 is a perspective view of the lower base of the coupler of FIG. 1, separated from the other base, to show its associated fiber mounted thereon, and the oval-shaped, facing surface of the fiber.

As illustrated in FIGS. 1 to 4, the coupler 10 of the present invention includes two strands 12A and 12B of a single mode fiber optic material mounted in longitudinal arcuate grooves 13A and 13B, respectively, formed in optically flat, confronting surfaces 14A and 14B, respectively, of rectangular bases or blocks 16A and 16B, respectively. The block 16A with the strands 12A mounted in the groove 13A will be referred to as the coupler half 10A, and the block 16B with the strand 12B mounted in the groove 13B will be referred to as the coupler half 10B.

Each of the strands 12A and 12B comprises a commercially available fiber of quartz glass which is doped to have a central core and an outer cladding. It will be seen below that the present invention is particularly advantageous for use with single mode fibers, which typically have a core diameter on the order of 10 microns or less and a cladding diameter on the order of 125 microns, although the invention may also be employed with other types of fibers, such as multi-mode fibers. In the embodiment disclosed, single mode fibers are—utilized—; however, for clarity of illustration, the diameter of the strands 12 and their respective cores are exaggerated. Furthermore, test results described herein are for couplers utilizing single mode fibers.

The arcuate grooves 13A and 13B have a radius of curvature which is very large compared to the diameter of the fibers 12, and have a width slightly larger than the fiber diameter to permit the fibers 12, when mounted therein, to conform to a path defined by the bottom walls of the grooves 13. The depth of the grooves 13A and 13B varies from a minimum at the center of the blocks 16A and 16B, respectively, to a maximum at the edges of the blocks 16A and 16B, respectively. This advantageously permits the fiber optic strands 12A and 12B, when mounted in the grooves 13A and 13B, respectively, to gradually converge toward the center and diverge toward the edges of the blocks 16A, 16B, thereby eliminating any sharp bends or abrupt changes in direction of the fibers 12 which may cause power loss through mode perturbation. In the embodiment shown, the grooves 13 are illustrated as being rectangular in cross-section, however, it will be understood that other suitable cross-sectional contours which will accommodate the fibers 12 may be used alternatively, such as a U-shaped cross-section or a V-shaped cross-section. Techniques for forming the grooves 13 and mounting the fibers 12 therein are discussed below.

At the centers of the blocks 16, in the embodiment shown, the depth of the grooves 13 which mount the strands 12 is less than the diameter of the strands 12, while at the edges of the blocks 16, the depth of the grooves 13 is preferably at least as great as the diameter of the strands 12. Fiber optic material was removed from each of the strands 12A and 12B to form respective oval-shaped planar surfaces 18A, 18B, which are coplanar with the confronting surfaces 14A, 14B, respectively. These surfaces 18A, 18B will be referred to herein as the fiber "facing surfaces". Thus, the amount of fiber optic material removed increases gradually from zero towards the edges of the block 16 to a maximum towards the center of the block 16. This tapered removal of the fiber optic material enables the fibers to converge and diverge gradually, which is advantageous for avoiding backward reflection and excess loss of light energy.

In the embodiment shown, the coupler halves 10A and 10B are identical, and are assembled by placing the confronting surfaces 14A and 14B of the blocks 16A and 16B together, so that the facing surfaces 18A and 18B of the strands 12A and 12B are in facing relationship.

An index matching substance (not shown), such as index matching oil, is provided between the confronting surfaces 14. This substance has a refractive index approximately equal to the refractive index of the cladding, and also functions to prevent the optically flat surfaces 14 from becoming permanently locked together. The oil is introduced between the blocks 16 by capillary action.

Figure 5:
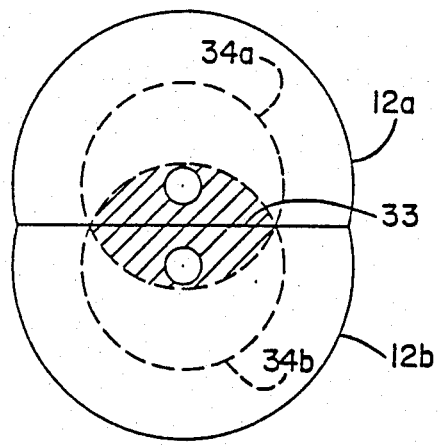
FIG. 5 is a schematic diagram showing the evanescent fields of the pair of fibers overlapping at the interaction region.

An interaction region 32 is formed at the junction of the strands 12, in which light is transferred between the strands by evanescent field coupling. It has been found that, to insure proper evanescent field coupling, the amount of material removed from the fibers 12 must be carefully controlled so that the spacing between the core portions of the strands 12 is within a predetermined "critical zone". The evanescent fields extend into the cladding and decrease rapidly with distance outside their respective cores. Thus, sufficient material should be removed to permit each core to be positioned substantially within the evanescent field of the other. If too little material is removed, the cores will not be sufficiently close to permit the evanescent fields to cause the desired interaction of the guided modes, and thus, insufficient coupling will result. Conversely, if too much material is removed, the propagation characteristics of the fibers will be altered, resulting in loss of light energy due to mode perturbation. However, when the spacing between the cores of the strands 12 is within the critical zone, each strand receives a significant portion of the evanescent field energy from the other strand, and optimum coupling is achieved without significant energy loss. The critical zone is illustrated schematically in FIG. 5 as including that area, designated by the reference numeral 33, in which the evanescent fields, designated by reference numerals 34A and 34B, of the fibers 12A and 12B, respectively, overlap with sufficient strength to provide coupling, i.e., each core is within the evanescent field of the other. However, as previously indicated, mode pertubation occurs within the area 33 when the cores are brought too close together. For example, it is believed that, for weakly guided modes, such as the $HE_{11}$ mode in single mode fibers, or high order modes in multi-mode fibers, such mode perturbation begins to occur when sufficient material is removed from the fibers 12 to expose their cores. Thus, the critical zone is defined as that area in which the evanescent fields 34 overlap with sufficient strength to cause coupling without substantial mode perturbation induced power loss.

The extent of the critical zone for a particular coupler is dependent upon a number of interrelated factors such as the parameters of the fiber itself and the geometry of the coupler. Further, for a single mode fiber having a step-index profile, the critical zone can be quite narrow. In a single mode fiber coupler of the type shown in FIGS. 1-4, for example, the required center-to-center spacing between the strands 12 at the center of the coupler is typically less than a few (e.g., 2-3) core diameters.

Preferably, the strands 12A and 12B are (1) identical to each other, (2) have the same radius of curvature at the interaction region 32, and (3) have an equal amount of fiber optic material removed therefrom to form their respective facing surfaces 18A and 18B. Thus, the fibers 12 are symmetrical through the interaction region 32 in the plane of the facing surfaces 18 so that the facing surfaces 18 are coextensive if superimposed. This insures that the two fibers 12A and 12B will have the same propagation characteristics at the interaction region 32, and thereby avoids coupling attenuation associated with dissimilar propagation characteristics.

The blocks or bases 16 may be fabricated of any suitable rigid material. In one presently preferred embodiment, the bases 16 comprise generally rectangular blocks of fused quartz glass approximately 1 inch long, 1 inch wide, and 0.4 inch thick. In this embodiment, the fiber optic strands 12 are secured in the slots 13 by suitable cement 38, such as epoxy glue. One advantage of the fused quartz blocks 16 is that they have a coefficient of thermal expansion similar to that of glass fibers, and this advantage is particularly important if the blocks 16 and fibers 12 are subjected to any heat treatment during the manufacturing process. Another suitable material for the block 16 is silicon, which also has excellent thermal properties for this application.

Operation of the Coupler 10

The coupler 10 includes four ports, labeled A, B, C, and D in FIG. 1. When viewed from the perspective of FIG. 1, ports A and C, which correspond to strands 12A and 12B, respectively, are on the lefthand side of the coupler 10, while the ports B and D, which correspond to the strands 12A and 12B, respectively, are on the righthand side of the coupler 10. For the purposes of discussion, it will be assumed that input light of a suitable wavelength (e.g., 1.15 microns) is applied to port A. This light passes through the coupler and is output at port B and/or port D, depending upon the amount of power that is coupled between the strands 12. In this regard, the term "normalized coupled power" is defined as the ratio of the coupled power to the total output power. In the above example, the normalized coupled power would be equal to the ratio of the power at port D to the sum of the power output at ports B and D. This ratio is also referred to as the "coupling efficiency", and when so used is typically expressed as a percent. Thus, when the term "normalized coupled power" is used herein, it should be understood that the corresponding coupling efficiency is equal to the normalized coupled power times 100. In this regard, tests have shown that the coupler 10 has a coupling efficiency of up to 100%. However, it will also be seen that the coupler 10 may be "tuned" to adjust the coupling efficiency to any desired value between zero and the maximum.

Furthermore, the coupler 10 is highly directional, with substantially all of the power applied at one side of the coupler being delivered to the other side of the coupler. The coupler directivity is defined as the ratio of the power at port D to the power at port C, with the input applied to port A. Tests have shown that the directionally coupled power (at port D) is greater than 60 dB above the contradirectionally coupled power (at port C). Further, the coupler directivity is symmetrical. That is, the coupler operates with the same characteristics regardless of which side of the coupler is the input side and which side is the output side. Moreover, the coupler 10 achieves these results with very low throughput losses. The throughput loss is defined as the ratio of the total output power (ports B and D) to the input power (port A), subtracted from one (i.e., $1-(P_B+P_D)/P_A$). Experimental results show that throughput losses of 0.2 dB have been obtained, although losses of 0.5 dB are more common. Moreover, these tests indicate that the coupler 10 operates substantially independently of the polarization of the input light applied.

The coupler 10 operates on evanescent field coupling principles in which guided modes of the strands 12 interact, through their evanescent fields, to cause light to be transferred between the strands 12. As previously indicated, this transfer of light occurs at the interaction region 32. The amount of light transferred is dependent upon the proximity and orientation of the cores, as well as the effective length of the interaction region 32. The length of the region 32 is, in turn, dependent upon the radius of curvature of the fibers 12, and, to a limited extent, the core spacing, although it has been found that the effective length of the interaction region 32 is substantially independent of core spacing. In one presently preferred embodiment, employing an edge-to-edge core spacing of about 1.4 microns, the radius of curvature is on the order of 25 centimeters, and the effective interaction region is approximately one millimeter long for a signal wavelength of 633 nm. With these dimensions, the light makes only one transfer between the strands 12 as it travels through the interaction region 32. However, if the length of the interaction region 32 is increased, or core spacing decreased, a phenomenon referred to herein as "overcoupling" will occur, in which the light will transfer back to the strand from which it originated. As the interaction length is further increased, and/or the core spacing further decreased, the light transfers back to the other strand. Thus, the light may make multiple transfers back and forth between the two strands 12 as it travels through the region 32, the number of such transfers being dependent on the length of the interaction region 32, and the core spacing.

Figure 6:
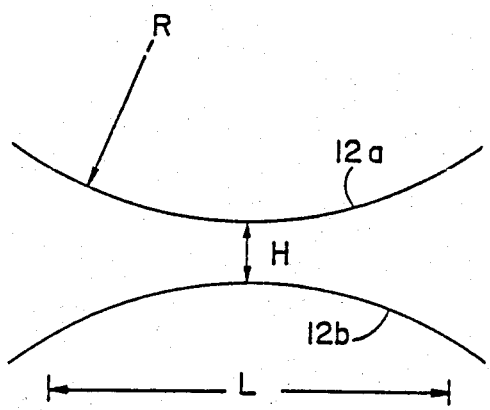
FIG. 6 is a schematic drawing of the coupler of FIG. 1, illustrating the radius of curvature, core spacing, and interaction length, as being parameters of the coupler.

The foregoing may be more fully understood through reference to FIG. 6 which shows a schematic representation of the coupler 10 of FIG. 1. The cores of fibers 12A and 12B are shown as gradually converging to a minimum spacing, labeled H, at the center of the coupler and diverging towards the edges of the coupler. The effective interaction length is labeled L and the radius of curvature of the strands 12A and 12B is labeled R. As indicated above, it has been found that, while the effective interaction length L is a function of the radius of curvature R, it is substantially independent of the minimum spacing H between the fibers 12. Although this independence is truly valid only for relatively large core spacings and short wavelengths, it provides a good approximation for most applications, and thus, it advantageously permits the coupler, illustrated in FIG. 6, to be analyzed as an "equivalent" coupler comprising two parallel wave guides, separated through their interaction length L, by a spacing H, as shown in FIG. 7.

Figure 7:
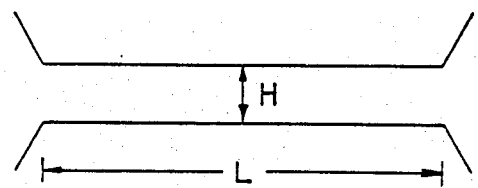
FIG. 7 is a schematic drawing of an "equivalent" coupler.
Figure 8:
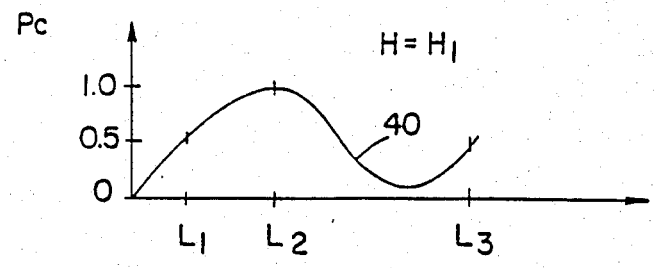
FIG. 8 is a graph of normalized coupled power as a function of interaction length for a given fiber core spacing.
Figure 9:
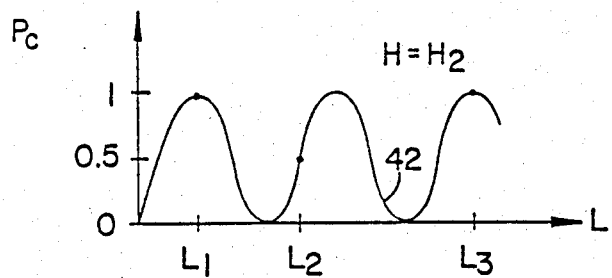
FIG. 9 is a graph of normalized coupled power as a function of interaction length for another fiber core spacing.

The effects of varying either the effective interaction length L or the fiber spacing H of the "equivalent" coupler shown in FIG. 7 may be understood through reference to FIGS. 8 and 9. FIG. 8 shows a sinusoidal curve 40 which illustrates that the coupled power $P_C$ varies sinusoidally as a function of the interaction length L for a given fiber spacing H. At this fiber spacing, it may be seen that the coupled power is approximately 50% when the interaction length is equal to $L_1$, and increases to 100% when the interaction length increases to $L_2$. If the interaction length is further increased, "overcoupling" results, in which light is transferred back to the strand from which it originated, and the coupled power $P_C$ begins to decrease towards zero. The coupled power then increases from zero to, for example, 50% at $L_3$. Thus, it may be seen that the amount of coupling may be varied by changing the effective length of the interaction region.

The effect of decreasing the spacing H between the fibers is to increase the strength of the coupling, and thus, increase the amount of light transferred over a given interaction length L, as shown by comparing the sinusoidal curve 42 of FIG. 9 with the sinusoidal curve of FIG. 8. For example, if the fiber spacing were decreased from $H_1$ (FIG. 8) to $H_2$ (FIG. 9), the coupled power may be 100% at interaction length $L_1$ in FIG. 9, as compared to 50% for the same interaction length $L_1$ in FIG. 8. The curve 42 then begins to demonstrate overcoupling and the coupled power decreases to 50% at interaction length $L_2$. At interaction length $L_3$, the curve 42 indicates that the coupled power is again 100%. Thus, for a given interaction length (e.g., $L_1$ $L_2$, or $L_3$), the amount of power coupled may be adjusted by changing the fiber core spacing.

Figure 10:
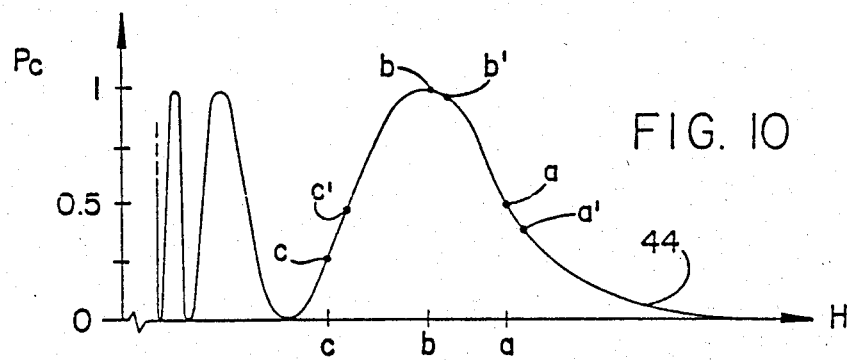
FIG. 10 is a graph of normalized coupler power as a function of minimum fiber core spacing (spacing surfaces superimposed)

The relationship between the minimum fiber spacing H and the coupled power $P_C$ for a given interaction length L (i.e., radius of curvature) is illustrated in FIG. 10 by the curve 44. As shown in this figure, the normalized coupled power oscillates between 0 and 1 as the frequency increases or the core spacing H decreases. The reference points a, b, and c on the curve H were chosen somewhat arbitrarily to indicate normalized coupled power of 0.5, 1.0, and 0.25, respectively. It will be recognized that at point a 50% of the power is coupled from one fiber to the other. At point b full coupling is achieved, and 100% of the optical power is transferred between the strands. Point c, on the other hand, represents an overcoupled condition wherein the coupled power has decreased from full coupling to 25%.

Tuning the Coupler 10

The foregoing concepts are useful in understanding the "tunability" aspects of the coupler 10. As used herein, the term "tuning" is defined as translating the fibers 12 relative to each other to adjust the power coupled therebetween. Such translation of the fibers 12 is accomplished by sliding the planar facing surfaces 18 relative to each other, so that they are offset, rather than superimposed. That is, the fibers 12 are mutually displaced in the plane of the planar facing surfaces. Viewed another way, such translation occurs when respective planes in which each of the fibers lie, are displaced relative to each other.

Figure 11:
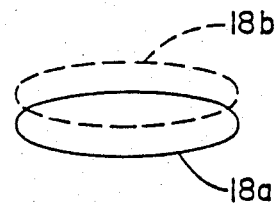
FIG. 11 is a schematic representation of the oval-shaped facing surfaces of the fibers, showing the facing surfaces laterally offset.

In one presently preferred method of fiber translation, the facing surfaces 18 are offset laterally. As used herein, the term "laterally offset" means sliding the facing surfaces 18 laterally from their superimposed position to increase the spacing between the fiber cores, while maintaining a substantially parallel relationship between the fibers 12. Such lateral offset of the facing surfaces 18 is illustrated schematically in FIG. 11. The effect of such lateral offset is, of course, to change the spacing between the cores of the fibers 12.

Figure 12:
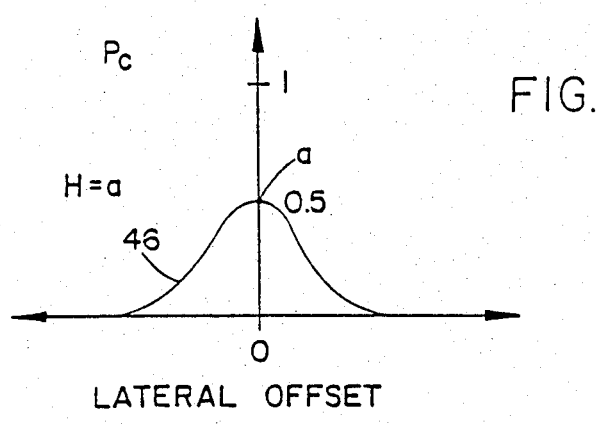
FIG. 12 is a graph of normalized coupled power as a function of lateral offset for a first minimum fiber core spacing.

The curve 46 of FIG. 12 graphically illustrates the effect of laterally offsetting the fiber facing surfaces 18 for a coupler having a minimum edge-to-edge core spacing H equal to a (FIG. 10). When the facing surfaces 18 of the fibers are superimposed (i.e., no offset), the normalized coupled power will be equal to 0.5, as required by the curve 44 of FIG. 10. However, when the facing surfaces 18 of the fibers 12 are laterally offset in either direction to increase the spacing between the cores, the coupled power gradually decreases to zero.

Figure 13:
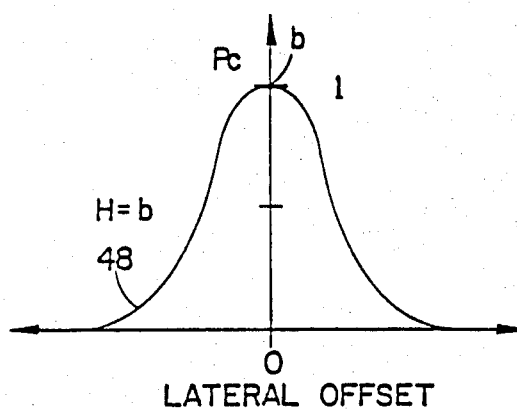
FIG. 13 is a graph of normalized coupled power as a function of lateral offset for a second fiber core spacing.

Referring now to the curve 48 of FIG. 13, the effect of lateral fiber offset upon normalized coupled power for a coupler having an edge-to-edge core spacing equal to b (FIG. 10) is shown. When there is no offset and the facing surfaces 18 are superimposed, the normalized coupled power is 1.0, as required by the curve 44 of FIG. 10, however, as the facing surfaces 18 of the fibers 12 are laterally offset in either direction, the coupled power gradually decreases.

Figure 14:
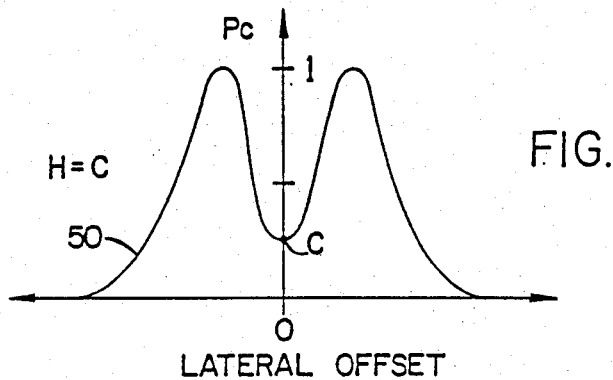
FIG. 14 is a graph of normalized coupled power as a function of lateral offset for a third fiber core spacing.

The curve 50 of FIG. 14 shows coupled power as a function of relative fiber offset for a core spacing equal to c (FIG. 10), which, as will be recalled, represents an overcoupled condition. From this curve 50, it may be seen that, when the facing surfaces 18 of the fibers 12 are superimposed, the normalized coupled power is 0.25. As the core spacing is increased by sliding the facing surfaces 18 so that they are laterally offset, the normalized coupled power initially increases to 1.0 and then decreases toward zero when the core spacing is further increased.

In all of the foregoing cases illustrated by FIGS. 12, 13 and 14, the coupled power decreases to zero at substantially the same lateral offset, assuming that the physical devices corresponding to these figures are identical except for their fiber spacing at zero offset. By comparing the curves 46, 48 and 50 of the FIGS. 12, 13 and 14, respectively, it may be seen that the respective slopes of these curves tend to increase as the core spacing decreases. Thus, the sensitivity of the coupler to lateral offset increases as the core spacing decreases. For example, a coupler fabricated to exhibit overcoupling, as in FIG. 14, is significantly more sensitive to lateral offset than couplers having the characteristics shown in either FIG. 12 or 13. This feature of the present invention is quite advantageous, since, in some coupler applications, high sensitivity to offset is an advantage while in other applications, it is a disadvantage. For example, co-pending patent application, Ser. No. 300,956, filed the same date as this application Sept. 10, 1981, entitled "Fiber Coupler Transducer," Michel J. F. Digonnet and Herbert John Shaw, inventors (now U.S. Pat. No. 4,461,536), assigned to the assignee of the present invention, and hereby incorporated by reference herein, discloses a fiber optic coupler utilized as a transducer for accurate measurement of minute displacement. The coupler is fabricated to be severely overcoupled to provide increased sensitivity for such displacement measurement. Further, the overcoupling characteristics of the coupler are utilized to provide several dynamic ranges of varying sensitivity. Although, in the above referenced displacement measurement application, increased sensitivity to lateral offset is advantageous, in the other applications such as signal processing and rotation sensor applications, low sensitivity and high stability are typically desirable. Thus, a coupler having coupling characteristics similar to those of FIGS. 12 and 13 (i.e., not overcoupled) is more appropriate for these applications. The coupler of the present invention, therefore, may be fabricated to have a minimum core spacing which provides a sensitivity to offset commensurate with its intended use.

Figure 15:
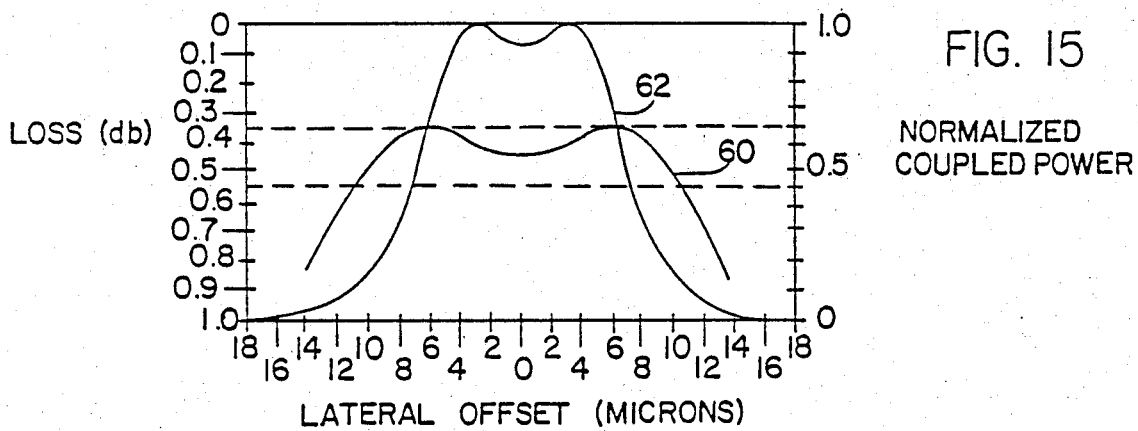
FIG. 15 is a graph of (a) normalized coupled power as a function of lateral offset and (b) throughput loss as a function of lateral offset for one exemplary coupler showing that the throughput loss is substantially constant over substantially the entire range of normalized coupled power.

Experimental evidence indicates that the throughput losses of the coupler 10 are substantially constant, except when the lateral offset of the cores is relatively large. Tests on one exemplary coupler showed that the throughput loss was within 0.2 dB of the minimum loss for a lateral offset of up to 10 microns in either direction. This coupler utilized a single mode fiber having a core index of 1.460, a cladding index of 1.4559, and a core diameter of 4 microns. The radius of curvature of the fibers was 25 centimeters, the edge-to-edge core spacing was approximately 0.9 microns, and the wavelength of the light utilized was 632.8 nm. FIG. 15 shows, for this exemplary coupler, a graph of throughput loss, designated by the reference numeral 60, and a graph of the normalized coupled power, designated by the reference numeral 62, both as a function of lateral offset of the facing surfaces 18. The two horizontal broken lines drawn through the center of FIG. 14 provide the upper and lower boundaries of an 0.2 dB power loss band. It may be seen that the power loss curve 60 is within this band for lateral offsets up to about 12 microns in either direction. Further, it may be seen that, at a 12-micron lateral offset, the normalized coupled power is approximately 0.1. Thus, for coupled power between 0.1 and 1, the power loss is within about 0.2 dB of the minimum power loss. If the power loss band is expanded to 0.5 dB, the power loss band is within the 0.5-dB band for fiber offsets of up to 15 microns, which corresponds to a coupled power of less than 0.05 (i.e., 5%). Thus, this coupler exhibits substantially constant throughput losses, i.e., within a relatively narrow power loss band width, throughout substantially the entire operating range of the device. Further, it is significant that the throughput losses are very low, and relatively constant for coupled power between 10% and 100%, as many fiber optic rotation sensors and fiber optic signal processing devices utilize couplers having coupling efficiencies in this range.

Test results show that throughput losses as low as about 0.2 dB have been attained, although losses of 0.5 dB are more common, as in the above-described exemplary examples.

Figure 16:
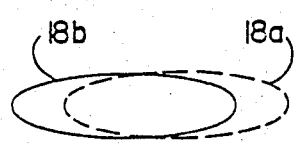
FIG. 16 is a schematic representation of the facing surfaces of the fiber, showing the facing surfaces longitudinal offset.

Since the coupling losses are relatively insensitive to lateral offset of the facing surfaces 18 throughout substantially the entire range of coupling efficiency, such lateral offset is a particularly advantageous method for tuning the coupler 10 to provide a desired amount of coupled power. However, it should be understood that the coupler characteristics may be changed by longitudinally offsetting the facing surfaces. The term, "longitudinal offsetting", as used in this sense, refers to translating the facing surfaces 18 from a superimposed position to an offset position in a direction parallel to the fibers 12, as illustrated schematically in FIG. 16. Such longitudinal offset, in effect, increases the minimum core spacing of the fibers 12. For example, referring back to FIG. 10, if it is assumed that the fiber spacing H, when the facing surfaces 18 are superimposed is equal to the value shown at point a, longitudinally offsetting the facing surfaces 18 will translate this point a along the curve 44 to a point labeled a'. Similarly, this longitudinal offset will translate the point b along the curve 44 to b' and the point c along the curve 44 to c'. This, of course, will produce corresponding changes in the offset curves of FIGS. 12, 13 and 14 by reducing the normalized coupled power at zero offset.

Experiments have shown that it requires a relatively large longitudinal offset to produce changes in coupling equivalent to those achieved by comparatively small lateral offsets. Thus, the coupler is comparatively insensitive to longitudinal offsets. In addition, it has been found that throughput losses are not affected significantly by longitudinal offsets. Therefore, with respect to longitudinal offsets, alignment of the facing surfaces 18 is not critical.

Figure 17:
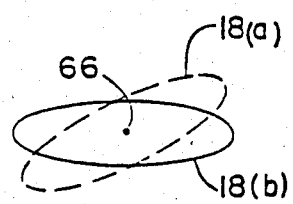
FIG. 17 is a schematic representation of the facing surfaces of the fibers, showing these facing surfaces rotationally offset.

The coupling characteristics of the coupler 10 may also be affected by rotating the facing surfaces 18 relative to each other, as this decreases the effective length of the interaction region. The term "rotationally offsetting" will be used to refer to translating the fibers, as illustrated schematically in FIG. 17, by rotating the facing surfaces 18 about a common axis, e.g., the axis 66. The effect of such rotational offsetting is similar to that described above for longitudinally offsetting the surfaces. That is, the coupler 10 is relatively insensitive to small rotational offsets, both in terms of changes in coupled power, as well as in throughput losses.

Thus, while minor adjustments to the coupled power may be provided by rotationally offsetting or longitudinally offsetting the facing surfaces, primary adjustments in coupled power are typically made by laterally offsetting the facing surfaces 18, although it will be understood that, in practice, a combination of these techniques may be utilized.

Figure 18:
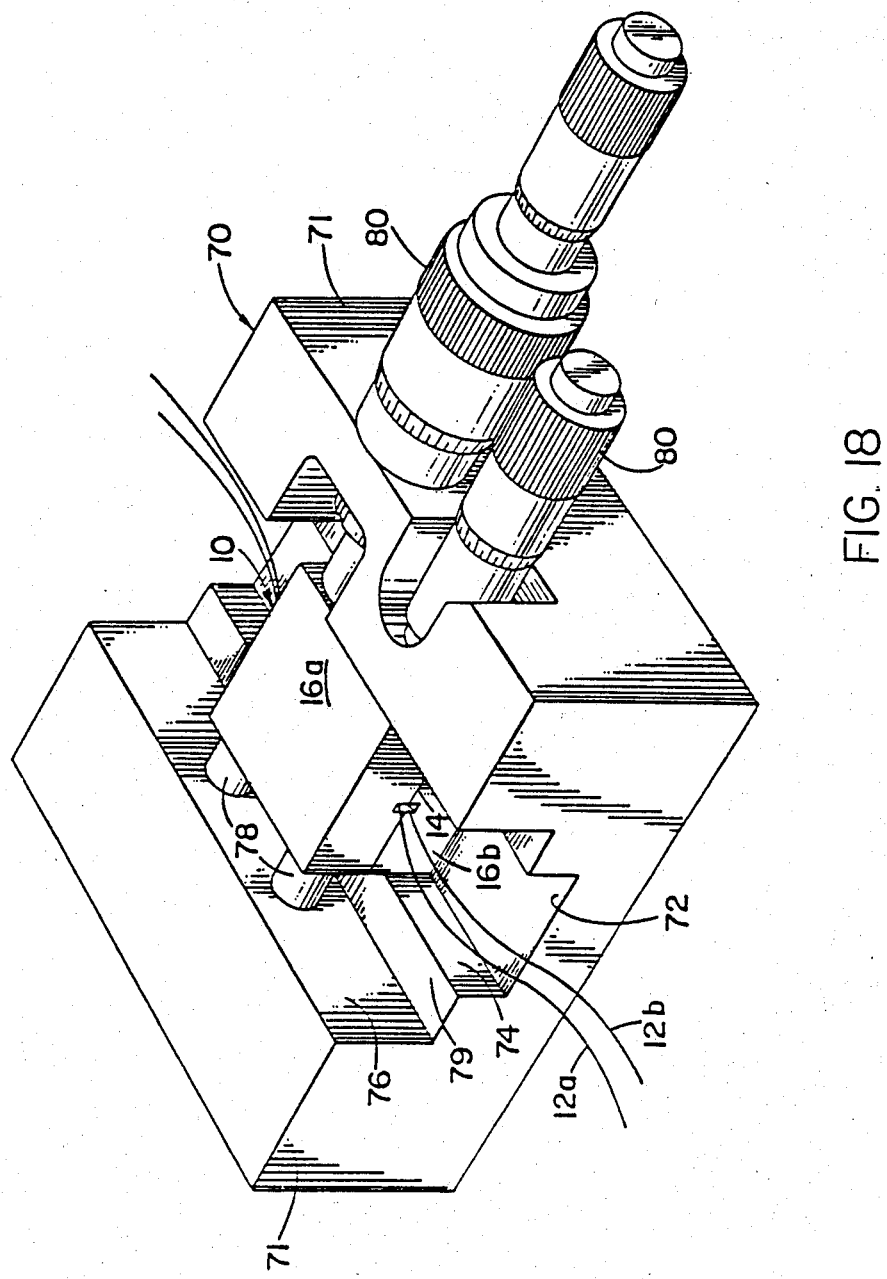
FIG. 18 is a perspective view of a tuning device having micrometers for adjusting the offset of the facing surfaces to tune the coupler to a desired coupling efficiency.

The coupler 10 may be mechanically tuned in accordance with the foregoing concepts by means of a tuning device 70, shown in FIG. 18. The device 70 comprises a micrometer carriage 71 having a stepped U-shaped channel 72. The lower portion 74 of the channel 72 is narrower than the upper portion 76, and is sized to rigidly mount the coupler block 16B, with the bottom of the block 16B resting on the bottom of the channel 72. The step transition 79 between the upper portion 76 and lower portion 74 is below the confronting surfaces 14 of the block, so that the upper block 16A may be translated, in a direction perpendicular to the channel 72, between the sidewalls forming the upper channel portion 76. The coupler 10 is oriented so that the strands 12 are in a direction parallel to the channel 72 to permit such translation to laterally offset the facing surfaces 18.

A pair of cylindrically shaped retainers 78 are slidably mounted to project from one sidewall of the upper portion 76 of the channel 72. These retainers 78 are spring loaded to bear against one side of the block 16A. Differential micrometers 80 are mounted on the opposite sidewall of the channel upper portion 76. The micrometers 80 bear against the opposite side of the block 16A, so that the block 16A is held between the micrometers 80 and the spring biased retainers 78.

By turning the micrometers 80, the position of the block 16A may be adjusted relative to the block 16B to superimpose the facing surfaces 18. Since the blocks 16 are comprised of transparent quartz, the relative positions of the facing surfaces 18 may be observed by utilizing a microscope. The surfaces 18 may also be laterally offset from their superimposed position, if desired, to tune the coupler 10 to the desired coupling efficiency, by turning the micrometers 80. Once the coupler 10 has been tuned, the blocks 16 may, if desired, be clamped, bonded or fused together to provide a coupler with a permanently or semi-permanently fixed coupling efficiency.

The device 70 may also be used to rotate the facing surfaces 18 relative to each other by turning one of the micrometers 80 to skew the blocks 16. Longitudinal offset the facing surfaces 18 may be accomplished by manually moving the blocks, since the coupler is relatively insensitive to longitudinal adjustments.

Use of the Coupler 10 As A Modulator or Switch

Figure 19:
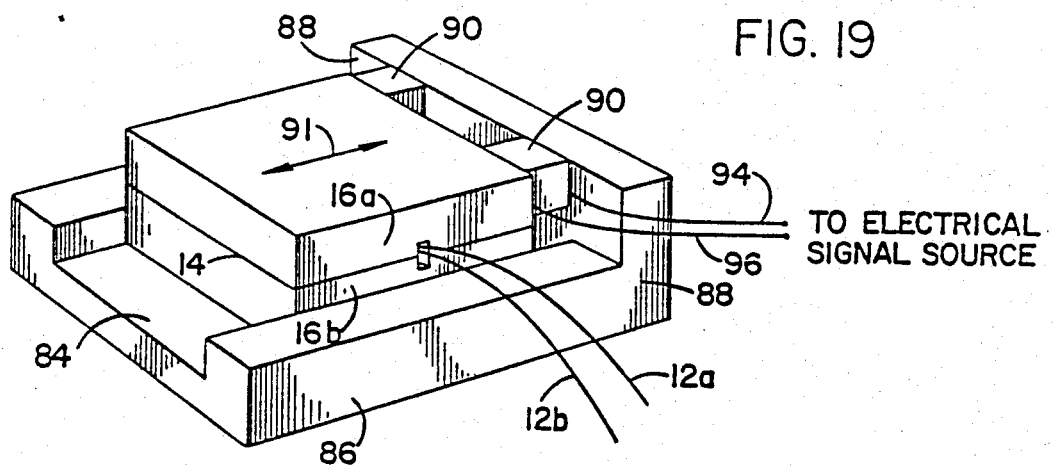
FIG. 19 is a schematic perspective view of a tuning device employing transducers to offset the facing surfaces in response to a signal so that the coupler of the present invention may be utilized as a modulator or switch.

As illustrated in FIG. 19, the blocks 16 may be translated relative to each other in response to an electrical signal to switch the coupled power (or coupling efficiency) from one value to another. In the embodiment shown, the lower block 16B of the coupler 10 is rigidly mounted in a horizontal, U-shaped, channel 84 of a base 86. The sidewalls of the channel 84 are lower than the confronting surfaces 14 of the blocks 16 so that they do not interfere with relative movement of the blocks 16. In the embodiment shown, the blocks 16 are oriented so that the fibers 12 are perpendicular to the channel 84.

A vertical wall 88, integral to the base 86, is provided at one end of the channel 84. The wall 88 is spaced from the block 16A so that a pair of piezoelectric (PZT) crystals 90 may be affixed, e.g., by adhesive, therebetween at the respective edges of the block 16A. The sides of the crystals 90 which abut the wall 88 and block 16A are connected by wire leads 94, 96 to an electrical signal source (not shown). When a voltage is applied between the leads 94, 96, the crystals 90, in response, move synchronously to slide the upper block 16A relative to the lower block 16B in a direction indicated by the arrow 91. With the fibers 12 in the orientation shown, this movement of the PZT crystals 90 translates the facing surfaces 18 (FIG. 1) to change their lateral offset. Since the coupled power is a function of the lateral offset, this movement will vary the coupled power between first and second values. These first and second values may, for example, be chosen to provide full coupling and no coupling, respectively, or they may be chosen to provide any combination of intermediate coupling values. Thus, in such manner, the coupler 10 may be utilized as an optical switch. Further, if a time varying signal is applied to the PZT crystals 90, the crystals will oscillate, and thus, the coupler 10 may function as a modulator.

The crystals 90 may also be utilized to longitudinally offset the facing surfaces 18 by orienting the blocks 16 so that the fibers 12 are parallel to the channel 84, rather than transverse thereto. Further, the crystals 90 may be used to rotate the facing surfaces 18 relative to each other by reverse polarizing one of the crystals 90 with respect to the other. This will cause the crystals to move synchronously in opposite directions in response to the electrical signal on the leads 94, 96, and thereby rotate the blocks 16 relative to each other.

It will be understood that other types of transducers may be used in place of the piezoelectric crystals to translate the blocks 16.

Method of Manufacture of the Coupler 10

The preferred method of manufacture of the coupler 10 provides for relatively precise control over the amount of material removed from the strands 12. This makes it particularly advantageous for couplers utilizing single mode fibers, because the evanescent field of a single mode fiber is typically buried deep within the cladding, and thus, it is very difficult to determine when enough material has been removed to provide a core spacing which yields the desired coupling characteristics. The method of manufacture solves this problem by (1) removing the material in increments, and (2) performing a simple test after each increment to determine the coupling characteristics for the core spacing associated with such increment. In this manner, the method permits manufacture of a coupler having given characteristics, and also permits duplication of other couplers having these characteristics. Further, this method permits the coupler 10 to be manufactured so that both coupler halves 10A and 10B are symmetrical. It will be recalled that symmetry is particularly important, since dissymmetry can alter the propagation characteristics of the coupler and result in attenuation of light energy, thereby preventing the coupler from achieving 100% coupling efficiency.

The method will be described in regard to the block 16A, it being understood that the block 16B is manufactured in the same manner. The method of manufacture comprises first grinding and polishing all of the sides of the block 16A so that their opposite sides are parallel and the block is rectangular.

Figure 20:
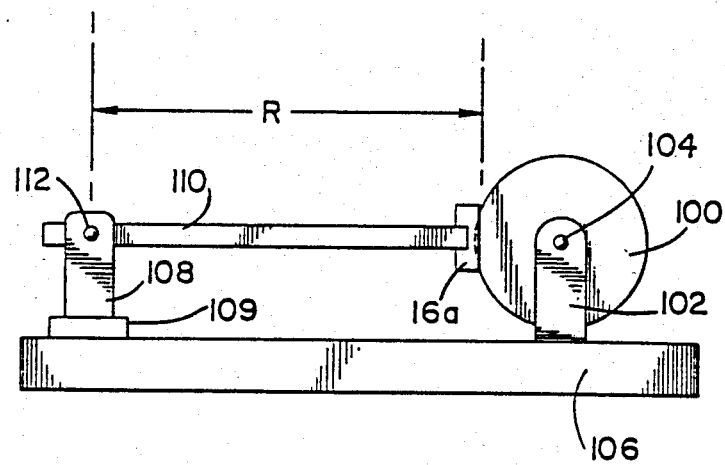
FIG. 20 is a schematic drawing of a sawing device for cutting the arcuate grooves in the mounting blocks.

The slot 13A is then cut in the face 14A utilizing the sawing device shown schematically in FIG. 20. The device comprises a diamond saw blade 100, mounted on a support bracket 102, for rotation about an axis 104. The blade 104 has a thickness equal to the desired width of the groove 13A. The member 102 is rigidly fastened to a base 106. A second support member 108, spaced from the member 102, is rigidly fastened to a movable chuck 109, mounted on the base 106. The member 108 mounts an arm 110 for rotation about an axis 112 and through a plane which is coextensive with the plane of the blade 100. The arm 110 has a length equal to the desired radius of curvature of the fiber 12A, and its axis 112 is the same height above the horizontal base 106 as the axis 104, so that the arm 110 is horizontal. A clamp (not shown) is provided for attaching the block 16A to the distal end of the arm 110 with the surface 14A facing the cutting edge of the blade 100. The movable chuck 109 is then used to move the arm 110, with the block 16A mounted therein, towards the saw blade 100, by means of a micrometer drive assembly (not shown). Such movement continues with the arm 110 maintained in a horizontal position, until the blade 100 cuts into the block 16A by a depth of about 1-½ times the diameter of the fiber 12. The arm 110 is then manually rotated about the axis 112 to cut the arcuate groove 13A in the block 16A. Since the distance between the axis 112 and the cutting edge of the blade 100 is equal to the desired radius of curvature, the groove will therefore be cut to the desired radius of curvature. The block 16A is then placed in an ultrasonic cleaner to clean the groove 13A and the surfaces of the block.

After cleaning, an ultraviolet sensitive adhesive is placed in the groove 13A. However, before mounting the strand 12A in the groove 13A, the jacket is removed from the portion of the fiber to be mounted at the center of the block 16A, so that this jacket does not interfere with lapping of the cladding. Advantageously, a small portion of the jacket extends into the groove 13A at each end of the block 16A to give the fiber strength at the points where it exits the block 16A. Once the fiber 12A has been placed in the groove 13A, small weights are attached to the ends of the strand 12A to tension it and draw it snugly against the bottom walls of the groove 13A. The entire assembly is then placed under an ultraviolet light to cure. Use of the ultraviolet sensitive adhesive is advantageous because the curing process will not begin until the adhesive is exposed to ultraviolet light, and thus, as much time as is necessary may be taken to position the fibers 12 in the grooves 13. Further, it is not necessary to apply heat to cure the adhesive, and therefore, there is no risk of damaging the fiber due to thermal expansion of the adhesive or the blocks 16.

Figure 21:
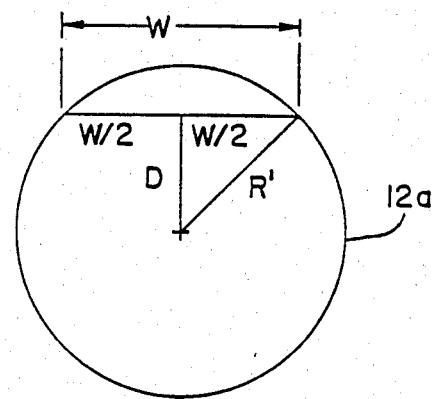
FIG. 21 is a schematic cross-sectional view of an optical fiber which illustrates that the depth to which the fiber has been lapped may be calculated by measuring the width of the facing surface.

Once the adhesive is cured, the excess adhesive is abrasively removed, as by a fine sandpaper. The surface 14A is then lapped, using a five micron grit, to within a preselected distance, e.g., 7 microns, from the center of the fiber 12A. As material is simultaneously removed from the fiber 12A and face 14A, an elongated oval-shaped planar surface, i.e., the facing surface 18A, will be formed on the fiber. Referring to FIG. 21, assuming that the fiber radius R' is known, distance D between this surface 18A and the center of the fiber 12A may be readily calculated by measuring the width W of the facing surface 18A with a microscope and utilizing the pythagorean theorem. However, this method of measurement referred to herein as the microscope measurement method, decreases in accuracy as the width of the facing surfaces 18 increases. Thus it has been found that it is preferable to use a second method of measurement, referred to as the block thickness method, after the distance between the facing surface 18A and the center of the fiber 12A is approximately equal to ¾ of the fiber radius. This second method of measurement comprises measuring the thickness of the block 16A. The facing surface to fiber center measurement, made by the above-described microscope method, is then subtracted from such thickness measurement to provide a reference value. As additional material is simultaneously removed from the fiber 12A and the block surface 14A, additional block thickness measurements are taken. The reference value is subtracted from these block thickness measurements to indicate the distance between facing surfaces 18A and the fiber center. The lapping process continues until the coplanar surfaces 14A and 18A have been lapped to the preselected distance, e.g., 7 microns, from the center of the fiber.

Upon reaching the desired distance from the center of the fiber, further material is removed from the fiber 12A by polishing the surface 14A with a cerium oxide polishing compound on a hard pitch lap. During this lapping process, the number of polishing strokes are recorded, and a test, referred to herein as the "oil drop test", is performed periodically. The frequency of this oil drop test depends upon the difference between the actual distance from the core and the desired distance from the core. As this difference decreases, the test should be run more frequently to avoid lapping too much material, as the material cannot be replaced once it is removed.

Figure 22:
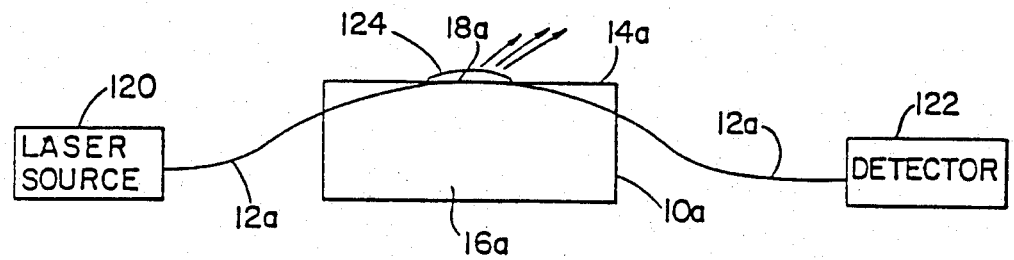
FIG. 22 is a schematic drawing illustrating the "oil drop test" utilized in manufacture of the coupler of FIG. 1.

The oil drop test is best understood through reference to FIG. 22. One end of the fiber 12A is optically coupled to a laser source 120 while the other end of this fiber is coupled to a detector 122, capable of measuring relatively low light intensities. The laser source 120 is energized and the detector reading is recorded to provide a reference value. A drop of index matching oil 124, having a refractive index slightly higher than that of the fiber core, is placed on the surface 14A so that it covers the entire facing surface 18A. This causes light to escape from the fiber 12A, the amount of such light being dependent upon the proximity of the facing surface 18A to the fiber core. A detector reading is then taken and the extinction ratio is calculated. As used in reference to the oil drop test, the extinction ratio is defined as the ratio of the measured light intensity at the detector 122 after index matching oil has been applied, to the measured light intensity at the detector without index matching oil. For a given oil index, the extinction ratio varies in proportion to the proximity of the facing surface 18 to the core, and thus, this ratio serves as an indication of the amount of material that has been removed from the strand 12A.

After the first oil drop test has been completed for the coupler half 10A, and the extinction ratio has been calculated, the block 16B of the second coupler half 10B is lapped, according to the foregoing procedures, until the oil drop test indicates that the extinction ratio for the second coupler half 10B is substantially the same as for the coupler half 10A, since this gives the coupler halves the desired symmetry. The coupler halves 10A and 10B are then assembled, with index matching oil between the confronting surfaces 14. The laser is then coupled to one of the strands 12, and the coupler is tuned for maximum coupling. The normalized coupler power is then measured and recorded. This procedure is repeated after each oil drop test, so that after all the tests have been complete, the data may be correlated to provide reference curves.

Figure 23:
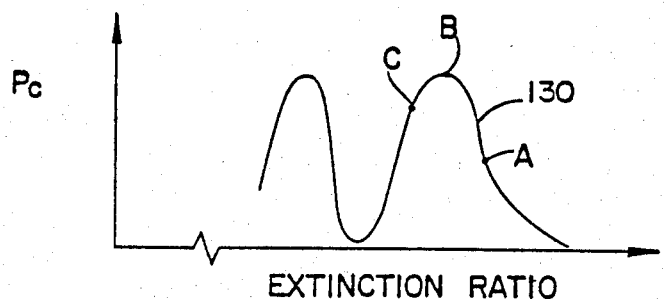
FIG. 23 is a graph of normalized coupled power as a function of extinction ratio, developed from "oil drop test: data, and utilized for reproducing couplers having desired coupling characteristics.
Figure 24:
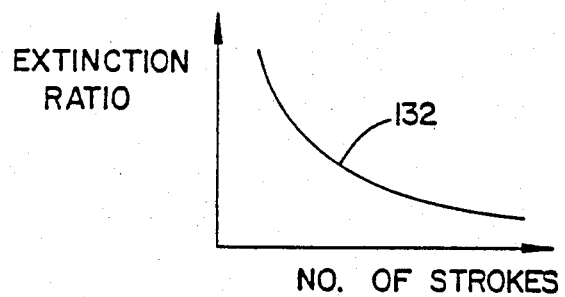
FIG. 24 is a graph of extinction ratio as a function of the number of lapping strokes, developed from oil drop test data, and used to determine the amount of additional lapping necessary to achieve a desired extinction ratio.

Two reference curves that have proven particularly useful are shown in FIGS. 23 and 24 as the curves 130, 132, respectively. Referring initially to FIG. 23, the curve 130 shows the extinction ratio as a function of the coupled power. This curve may be advantageously utilized in producing additional couplers having desired characteristics, without each time repeating all of the above-described data gathering techniques. For example, if a coupler having a maximum coupling efficiency of 50% is desired, the coupler halves 10A and 10B would be lapped until an extinction ratio corresponding to point "A" on the curve 130 is measured by the oil drop test. Likewise, if a coupler having a coupling efficiency of 100% is desired, the block 16 would be lapped until an extinction ratio corresponding to the point "B" is measured. Similarly, if a coupler exhibiting slight overcoupling characteristics is desired, the blocks 16 would be lapped until an extinction ratio corresponding to the point "C" is measured. Thus, by using the curve 130, it becomes relatively easy to manufacture subsequent couplers having desired coupling characteristics. However, it will be understood that, since the coupling characteristics are dependent upon fiber parameters, radius of curvature, and wavelength of the light utilized, separate curves 130 should be developed for each set of these parameters for which coupler manufacture is desired.

Referring to FIG. 24, the curve 132 shows the extinction ratio as a function of the number of polishing strokes. This curve may be used advantageously after each oil drop test to estimate the number of additional polishing strokes required to decrease the extinction ratio from the value associated with the test to the value selected from FIG. 23.

Thus, by utilizing the curves 130, 132, any given coupler may be reproduced, with the coupler halves 10A and 10B symmetrical.

It is important to recognize that, to provide reproducible results, the oil drop test should be performed at the same oil index each time. This is difficult, since index matching oil is sensitive to temperature changes, and thus, temperature fluctuations can cause errors in test results. Two approaches have been developed to solve this problem. The first approach can best be understood through reference to FIG. 25 which illustrates the relationship between power loss at the facing surface 18 and oil index, for various distances D between the facing surface 18 and the fiber center. The power loss peaks sharply when the index of the oil 124 is the same as the index of the fiber core. Further, this peak occurs at the same index, regardless of the distance D between the facing surface 18A and the fiber core. Accordingly, to insure that, for each test, the oil 124 has the same index, the oil 124 is heated, e.g., by an air gun, to reduce its index. The detector is simultaneously monitored, and the minimum reading is recorded. Since this minimum reading always occurs at the point when the power loss is at a maximum, and since the power loss is at a maximum when the oil index is equal to the core index, such minimum detector reading will occur at the same oil index. Thus, by utilizing this minimum reading in calculating the extinction ratio, substantially reproducable and error-free results may be provided for the oil drop tests.

Figure 25:
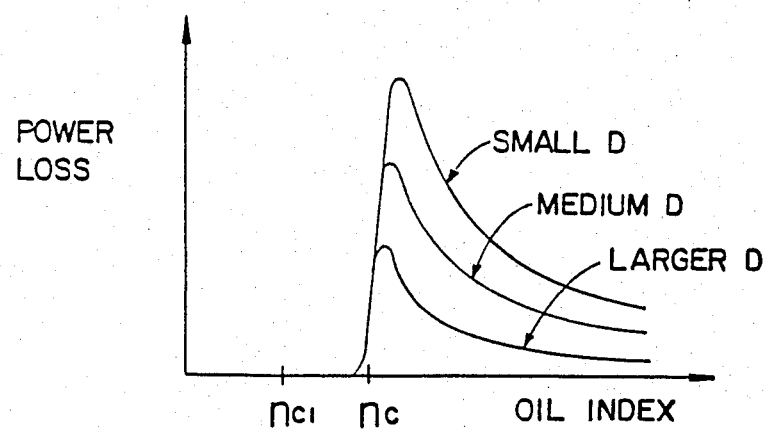
FIG. 25 is a graph of power loss as a function of oil index for the "oil drop test."

With regard to the second approach, it will be observed that the power loss curves of FIG. 25 become relatively flat at higher indexes. Thus, at these higher indexes, the power loss is relatively insensitive to slight changes in the index, and therefore, errors caused by small changes in oil index may be reduced by using oil having such higher index. It will be noted, however, that the differential power loss (i.e., the distance between the curves) for various fiber spacings decreases as the oil index increases. Indeed, as the index increases, the curves tend to converge. Thus, in this second approach, a balance must be drawn between the temperature sensitivity of the oil index and the differential power loss. That is, the oil index that is selected should be sufficiently high to provide relative insensitivity to oil index changes, but should be sufficiently low to provide an adequate power loss differential between the curves so that the detector readings at various core-to-facing surface distances will be meaningful.

What is claimed is:

1. A method of manufacturing a fiber optic directional coupler comprising:
   A. removing a portion of the cladding from a clad fiber at a location intermediate the ends of said fiber;
   B. introducing light into one end of said fiber for propagation to the other end of said fiber;
   C. providing an index matching substance at said location, said index matching substance causing at least a portion of said light propagating through said fiber to escape from said fiber;
   D. determining the proportion of the total light introduced at said one end that propagates through said fiber to said second end;
   E. selecting a first coupling efficiency from a range of coupling efficiencies;
   F. determining the desired value of the proportion of the total light at the second end corresponding to said first coupling efficiency;
   G. performing steps a through d until said proportion of the total light at said second end is equal to said desired value;
   performing all of the foregoing steps for a second fiber; and
   accurately positioning said fibers together, with their cores in close spaced relationship at their respective predetermined locations to form a coupler having said first coupling efficiency.

2. A method of manufacturing a fiber optic directional coupler, as defined by claim 1, additionally comprising:
varying the spacing between the cores of said fibers by an amount sufficient to provide a second predetermined coupling efficiency.

3. A method of manufacturing a fiber optic directional coupler, comprising:
removing a portion of the cladding from a clad fiber at a predetermined location intermediate the ends of said fiber;
introducing light into one end of said fiber for propagation to the other end of said fiber;
applying an index matching substance having a refractive index slightly different than the fiber core to said predetermined location;
changing the temperature of said index matching substance after it has been applied to said predetermined location to correspondingly change the refractive index thereof so that this index, at least momentarily, matches the index of the core to cause at least a portion of said light propagating through said fiber to escape from said fiber;
determining the value of the proportion of the total light introduced at said one end that propagates through said fiber to said second end when the index of said index matching substance is equal to the index of the core;
performing all of the foregoing steps until said proportion of the total light at said second end is equal to a preselected value, said preselected value corresponding to a first coupling efficiency for said coupler;
performing all of the foregoing steps for a second fiber; and
accurately positioning said fibers together, with their cores in close spaced relationship at their respective predetermined locations to form a coupler having said first coupling efficiency.

4. A method of precisely removing cladding material from an optical fiber for an optical coupler having a desired coupling efficiency, said method comprising:
selecting the desired coupling efficiency from a range of coupling efficiencies;
removing a portion of the cladding from a finite length of said fiber to form a facing surface;
measuring the extinction ratio of said fiber;
utilizing test data which indicates the relationship between extinction ratio and coupling efficiency for said optical fiber to determine the coupling efficiency which will result from superimposing said surface on an identical facing surface of a second fiber having said measured extinction ratio; and
continuing said removing step and said measuring step until said measured extinction ratio corresponds to the desired coupling efficiency.

5. A method of removing cladding material from an optical fiber, as defined in claim 4, wherein said extinction ratio measuring step comprises:
A. coupling a source of illumination to one end of said fiber;
B. measuring the amount of light propagating to the other end of said fiber;
C. placing an index matching material at said facing surface of said fiber and repeating Step B; and
D. calculating the extinction ratio utilizing the measurements from Steps B and C.

6. A method of reproducibly performing an extinction ratio test on an optical fiber, comprising:
placing an index matching material adjacent said fiber;
altering the refractive index of said material;
measuring said extinction ratio to provide a characteristic curve of extinction ratio versus refractive index; and
selecting the extinction ratio at a peak of said curve.

7. A method of reproducibly performing an extinction ratio test, as defined by claim 6, wherein the refractive index of said index matching material is slightly higher than the refractive index of the fiber core.

8. A method of reproducibly performing an extinction ratio test, as defined by claim 6, wherein said altering step comprises changing the temperature of said index matching material.

9. A method of reproducibly removing a precise amount of cladding from optical fibers for optical couplers, comprising:
testing a first pair of fibers, to determine their extinction ratios, said fibers each having a portion of the cladding removed from one side thereof to provide respective facing surfaces;
testing said first pair of fibers to determine the coupling therebetween to provide a relationship between the extinction ratio and the corresponding coupled power for said first pair of fibers;
using said relationship for said first pair of fibers to select an extinction ratio for a second pair of fibers which provides a desired coupled power for said second pair of fibers; and
removing a portion of the cladding from each of said second pair of fibers until said selected extinction ratio is achieved to provide said desired coupled power for said second pair of fibers.

10. A method of reproducibly removing a precise amount of cladding from optical fibers, as defined by claim 9, wherein said step of testing said first pair of fibers to determine their extinction ratios comprises:
A. measuring the extinction ratio of each of said first pair of fibers to provide a first extinction ratio value;
B. removing additional cladding material from said one side of each of said first pair of fibers; and
C. repeating step A to provide a second extinction ratio value.

11. A method of reproducibly removing a precise amount of cladding from optical fibers, as defined by claim 10, wherein said step of testing said first pair of fibers to determine the coupling therebetween comprises:
1. positioning said facing surfaces of said first pair of fibers in facing relationship;
2. determining, at said first extinction ratio value, the corresponding coupling efficiency of said first pair of fibers;
3. repeating Steps 1 and 2 for said second extinction ratio value; and
4. utilizing the corresponding values of said extinction ratios and said coupling efficiencies to provide said relationship.

12. A method of reproducibly manufacturing optical couplers comprising:
providing a coupler comprising a first pair of fibers;
testing said first pair of fibers to determine the extinction ratio for each of said fibers and to determine the coupling between said fibers when said fibers are juxtaposed;

removing a portion of the cladding from one side of each of a second pair of fibers;

measuring the extinction ratio of each of said second pair of fibers; and repeating said removing step and said measuring step until said extinction ratio of said second pair of fibers is the same as the extinction ratio of said first pair of fibers to reproduce the coupling of said first pair of fibers in a coupler utilizing said second pair of fibers.

13. A method of forming a facing surface on the cladding of a fiber optic strand at a distance greater than zero from the core of said strand, said method comprising:

removing a portion of the cladding from one side of said fiber strand, without affecting the core of said fiber strand, to form said facing surface;

illuminating said strand to propagate light therethrough;

determining whether the portion of strand illumination which escapes at said facing surface of said strand has reached a predetermined value to determine whether said facing surface is at said distance from the core of said fiber strand; and repeating all of the foregoing steps until said strand illumination which escapes at said facing surface reaches said predetermined value.

14. A method of forming a facing surface on the cladding of a fiber optic strand, as defined in claim 13, wherein said determining step comprises:

applying an index matching material to said facing surface of said strand; and measuring the light propagating through said strand.

15. A method of forming a facing surface on the cladding of a fiber optic strand, as defined in claim 13, wherein said precise distance is within three core diameters of said core.

16. A method of forming a facing surface on the cladding of a fiber optic strand to provide evanescent penetration at said facing surface, said method comprising:

removing a portion of the cladding from one side of said fiber strand, to form said facing surface such that said fiber at said facing surface is rotationally non-symmetric;

illuminating said strand to propagate light therethrough;

determining the amount of strand illumination which escapes at said facing surface to provide an indication of the evanescent penetration at the facing surface; and repeating all of the foregoing steps to increase said strand illumination which escapes at said facing surface.

17. A method comprising:

introducing optical energy into one end of an optical fiber having an inner core and an outer cladding such that said optical energy propagates along said fiber;

removing a portion of the cladding from one side of said fiber to form a facing surface;

providing a material on said facing surface having an index of refraction greater than or substantially equal to the index of refraction of said core;

detecting the amount of optical energy which escapes from the facing surface; and removing additional cladding material in accordance with the results of said detection step.

18. A method for fabricating an optical waveguide evanescent wave coupler, from optical waveguides of the type having a core concentrically surrounded by a cladding material, said method comprising the steps of:

A. transmitting optical energy through the core of a first optical waveguide thus illuminating the core;

B. removing a portion of the cladding from said first optical waveguide to form a flat surface on one side of said waveguide;

C. detecting the amount of light escaping from the illuminated core of said first optical waveguide to provide an indication of the evanescent penetration at said surface;

D. stopping the removal of the cladding material when said amount of light indicates a desired amount of evanescent penetration;

E. performing the steps of transmitting, removing, detecting and stopping for a second optical waveguide;

F. placing said first and second optical waveguides with the removed cladding surfaces in juxtaposition such that evanescent wave coupling occurs.

19. A method of determining the evanescent field penetration at a surface of an optical fiber having an inner core and an outer cladding comprising:

introducing optical energy into one end of said optical fiber such that said optical energy propagates along said fiber;

placing a material on said surface having a first index of refraction;

altering the refractive index of the material from said first refractive index to a second refractive index closer to the refractive index of said core than said first refractive index; and detecting the amount of optical energy which escapes from said fiber during said altering step to determine the amount of evanescent field penetration at said surface.

20. The method of claim 19 wherein said second refractive index is substantially equal to the refractive index of the core.

21. The method of claim 19 wherein said altering of the refractive index of the material includes changing the temperature of the material.

22. The method of claim 19 or 21 wherein one of said first and second indices is below the index of said core and the other of said first and second indices is above the index of the core.

* * * * *